Figure 1:
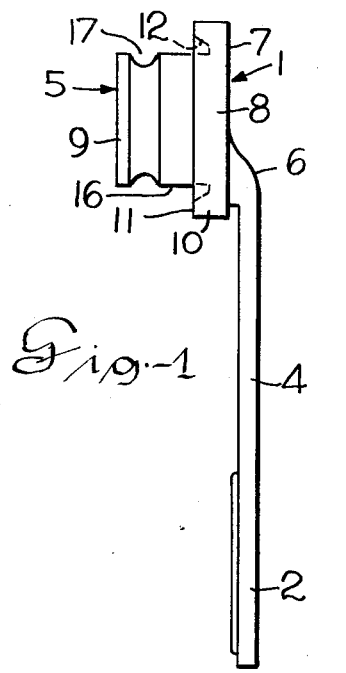

United States Patent [19]
Heckenkamp

[11] 4,016,908
[45] Apr. 12, 1977

[54] UNIVERSAL DUST COVER FOR A HYDRAULIC COUPLING SOCKET

[75] Inventor: Edward B. Heckenkamp, Brookfield, Wis.

[73] Assignee: Allis-Chalmers Corporation, Milwaukee, Wis.

[22] Filed: Aug. 4, 1975

[21] Appl. No.: 601,845

[52] U.S. Cl. .............................. 138/96 R; 215/306; 222/562

[51] Int. Cl.² .................. B65D 59/06; F16L 57/00

[58] Field of Search .............. 138/89.1, 89.2, 89.3, 138/89.4, 96 R, 178; 215/211, 222, 224, 306, 317, 321; 137/800; 222/544, 562, 563; 285/45

[56] References Cited
UNITED STATES PATENTS

| | | | |
|---|---|---|---|
| 1,686,562 | 10/1928 | Jackson | 138/89 |
| 3,407,956 | 10/1968 | Linkletter et al. | 215/306 |
| 3,765,578 | 10/1973 | Stull | 215/223 X |

FOREIGN PATENTS OR APPLICATIONS

| | | | |
|---|---|---|---|
| 1,372,433 | 1964 | France | 215/306 |
| 531,873 | 1955 | Italy | 215/317 |

*Primary Examiner*—Richard E. Aegerter
*Assistant Examiner*—Frederick R. Schmidt
*Attorney, Agent, or Firm*—Arthur L. Nelson

[57] ABSTRACT

A dust cover for selective use in sockets of different cross sectional configurations. The couplings are provided in hydraulic lines between a tractor and an implement where coupling and decoupling of the interconnected line is needed. The cover is used in the socket end of the coupling for cleanliness of fluid handling in the hydraulic system and to assure that the impurities are not allowed to contaminate the system by entrance into an open socket when the coupling is decoupled.

9 Claims, 4 Drawing Figures

U.S. Patent

April 12, 1977

4,016,908

UNIVERSAL DUST COVER FOR A HYDRAULIC COUPLING SOCKET

This invention relates to hydraulic couplers for connection between a tractor and implement and, more particularly, to a dust cover which can be selectively used on more than one type of the socket sections of a hydraulic coupling when the coupling is decoupled.

Hydraulic systems used on the conventional tractor operate hydraulic auxiliary equipment on the tractor. Tractors using hydraulic equipment employ a hydraulic pump on the tractor supplying the pressurized fluid for use in the motors and hydraulic actuators on the tractor and also on the implement drawn by the tractor. With the use of hydraulic equipment on the implement, it is necessary that the hydraulic lines are provided with a coupling for coupling and decoupling when the implement is coupled and decoupled with the tractor. When the coupling is decoupled, the socket section of the coupling is open and exposed to the atmosphere and, consequently, foreign material such as dust and dirt may be deposited within the socket which will contaminate the hydraulic system when the coupling is again coupled and in service. A dust cover is used in the socket of the socket section of the coupling to keep the socket free of foreign material which would contaminate the hydraulic system when the coupling is again coupled. It is imperative that cleanliness be exercised in using a hydraulic system of this type because the foreign material may be abrasive or may cause clogging and otherwise defective operation and limit the life of the components in the hydraulic system.

Accordingly, a dust cover is provided to close the socket in the socket section of the hydraulic coupling. Since there are more than one type of coupling, it is generally necessary to have a special dust cover for each coupling. This invention, however, provides for a single dust cover which will accomodate at least two different shapes of sockets in the socket section of the coupling. This provides for more economical manufacture of the dust cover and maintains the reliability necessary on a coupling of this type.

It is an object of this invention to provide a plurality of couplings with a dust cover to selectively seal at least two different types of sockets in the socket section of the hydraulic coupling when the coupling is decoupled.

It is another object of this invention to provide a dust cover for a hydraulic coupling.

It is a further object of this invention to provide a dust cover for selective use on a plurality of couplings.

It is a further object of this invention to provide a universal dust cover for the socket section of a hydraulic coupling when the coupling is decoupled.

The objects of this invention are accomplished by providing a rubber dust cover having a plug end for reception in either of two types of socket sections of hydraulic couplings. A fastening loop is provided to fasten the dust cover to the coupling with a strap connected between the loop and the plug end. The plug end is formed with sealing surfaces and a retainer groove adapted for engaging retainer elements in the coupling for holding the dust cover on the coupling.

Figure 2:
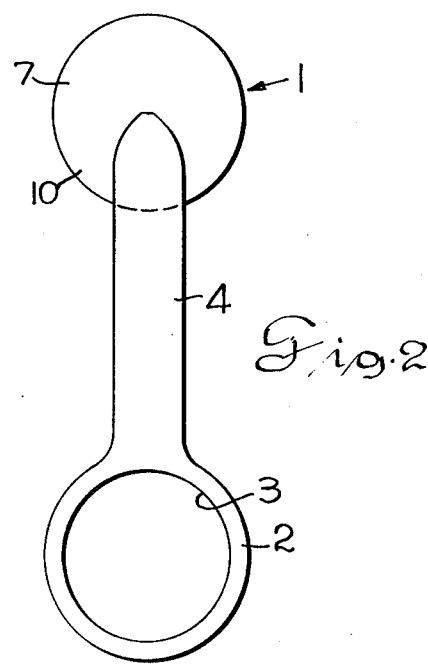
Figure 3:
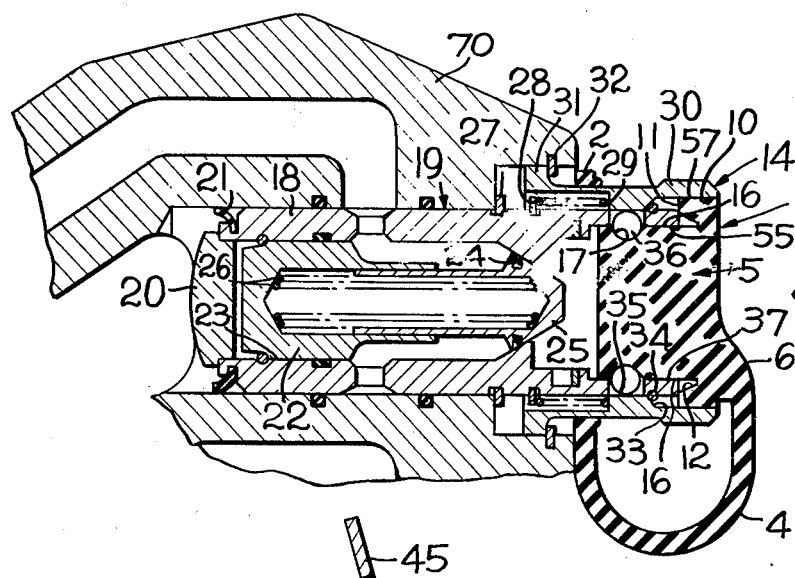
Figure 4:
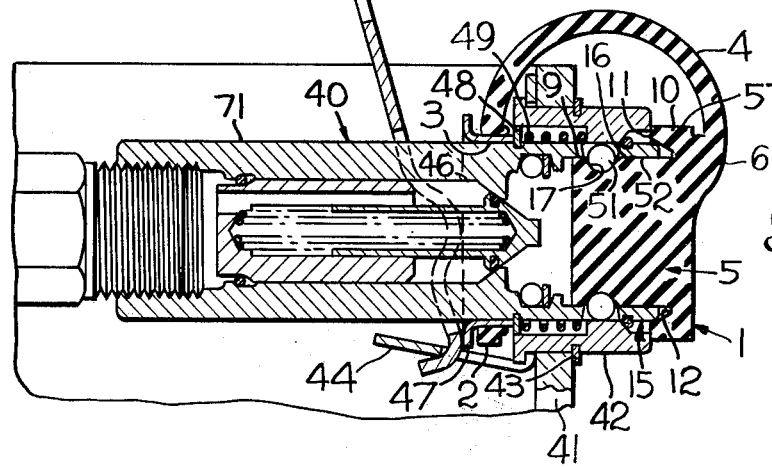

The preferred embodiment of this invention is illustrated in the attached drawings:

FIG. 1 is a side elevation view of the dust cover;
FIG. 2 is a top view of the dust cover;
FIG. 3 is a cross-section view of the socket section of a coupling receiving the plug end of the dust cover with a fastening means connecting the dust cover to the coupling.
FIG. 4 is a cross-section view of a modification of a socket section of a coupling with the dust cover having the plug end received in the socket section and a fastening loop fastening the dust cover to the coupling.

Referring to FIGS. 1 and 2, the dust cover 1 shows a fastening loop 2 defining an opening 3 for reception on the coupling and fastening the dust cover on the coupling, whether it be in position in the socket or carried on the coupling when the coupling is coupled. The connecting strap 4 connects the fastening loop to the plug end 5. The strap 4 is connected by the raised portion 6 on the facing 7 of the plug end 5. The facing 7 is formed on the disc portion 8 which is integral with the plug portion 9. The disc portion 8 supports the axial flange 10 which extends axially from the disc portion 8. The flange 10 forms an annular recess 12 intermediate to the flange and the plug portion 9. The flange 10 is tapered toward the surface 7 to reinforce the flange and maintain a firm contact of the sealing edge 11 with a portion of the socket in the socket section 14 and 15. The plug end 5 forms a cylindrical surface 16 for extending into the socket of the coupling. An annular retainer groove 17 is formed on the periphery of the plug end 5 for reception of the detent elements in the socket section of the hydraulic coupler. Referring to FIG. 3, the bracket 70 supports the sleeve 18 of the socket section 19 of the coupling. The sleeve 18 supports the cap 20 and a seal 21. The spring element retainer 22 is received within the cylindrical opening 23 of the sleeve 18. The sleeve 18 forms a valve seat 24 which engages the valve element 25 which is biased to an engaging position by the springs 26.

The socket section 19 of the coupling is retained in the bracket 70 and prevented from moving in a left-hand direction by the snap ring 27. The snap ring 28 forms a spring seat for the spring 29 biasing the retainer sleeve 30 in a right-hand position where the flange 31 engages a snap ring 32. The cam surface 33 engages the snap ring 34 while the surface 35 maintains the detent balls 36 in the retainer groove 17. When the coupling is decoupled as shown in FIG. 3, the socket is open. The dust cover 1 is shown with the plug end 5 received within the socket 37. Accordingly, the socket is kept in a clean, uncontaminated condition to insure reliable operation of a hydraulic system.

FIG. 4 illustrates a modification of a socket section 40 of a hydraulic coupling. The bracket 41 supports the socket section 40 of the coupling. The socket section 40 of the coupling is retained in position by the snap ring 43. The hinge collar 44 provides a fulcrum for the lever 45. The cam surface 46 of lever 45 engages the hinge collar 47 which presses against the snap ring 48 to compress the spring 49 and bias the coupling sleeve 71 in the right-hand direction to permit release of the detent balls 51. The sleeve 71 in the coupling as shown forms a socket 52 which receives the dust cover 1. The retainer groove 17 receives the detent balls 51 when the dust cover is used in the socket. It is noted that the fastening loop 2 is fastened on the hinge collar 47 to connect the dust cover to the coupling.

The operation of the dust cover will be described in the following paragraphs.

The dust cover 1 is shown with a fastening loop embracing the socket section of the coupling. The strap 4 is integral with the loop 2 and the plug end 5 and supports the dust cover when it is not in use. The dust cover as shown in FIG. 3 is positioned with its plug end 5 received in the socket 37. The detent balls 36 are received in the retainer grooves 17. The cylindrical surface 16 is pressed against the suface 55 in sealing relationship. Similarly, the surface 11 of the sealing flange 10 seals the inner periphery of the coupling. The peripheral surface 57 seals the inner periphery of the retainer sleeve 30 as well to provide a sealed condition for the socket of the section 19.

Similarly, the retainer groove 17 receives the detent balls 51 to hold the plug end of the dust cover in position as shown in FIG. 4. The sealing surface 11 engages the end of the retainer sleeve 42 to seal the periphery of the socket section 40. The cylindrical section 9 of the plug end also forms a sealing surface on the inner periphery of the sleeve 71. Accordingly, it can be seen that the dust cover 1 is interchangeably used on two different constructions of the socket sections of a hydraulic coupler.

The embodiments of the invention in which an exclusive property or privilege is claimed are defined as follows:

1. A resilient dust cover in combination with a socket section of a hydraulic coupling comprising, a hydraulic coupling including a socket section defining a socket said socket section including detent means on the inner periphery thereof, an expandable fastening loop extending peripherally around the socket section of the hydraulic coupling, a deformable plug portion, a flexible strap integrally connecting said fastening loop and said plug portion for carrying said plug portion of the dust cover when said dust cover is not in use, said plug portion including, a plug end said deformable plug portion received within the socket of the socket section of said hydraulic coupling and deforming when received in or removed from the socket, said plug portion defining a peripheral retaining groove adjacent said plug end for receiving said detent means on the inner periphery of the socket section of said hydraulic coupling for retaining the plug portion in the socket of said coupling, a disc portion integral with said plug portion extending radially from said plug portion and including a sealing flange extending axially from the peripheral of said disc portion resiliently biased radially and axially for sealing the periphery of said socket section of said hydraulic coupling, a raised portion on said disc portion joining said strap with said disc portion to allow said disc portion and said flange to be positioned either axially external of the socket of the socket section of the hydraulic coupling or to be received within the internal periphery of the socket, said axial sealing flange forming an annular recess intermediate said plug portion and said flange, said recess providing greater resilience to said flange to permit sealing engagement of said flange with said socket section.

2. A resilient dust cover in combination with a socket section of a hydraulic coupling as set forth in claim 1 including a rubber material forming said resilient dust cover.

3. A resilient dust cover in combination with a socket section of a hydraulic coupling as set forth in claim 1 including, a sealing surface formed by the radially outer periphery of said disc portion adapted for engaging an inner periphery of the socket of the socket section of the hydraulic coupling.

4. A resilient dust cover in combination with a socket section of a hydraulic coupling as set forth in claim 1 wherein said disc portion defines a planar surface on the external side of said disc portion, said rasied portion joining said strap with said disc portion defining a protrusion from said planar surface.

5. A resilient dust cover in combination with a socket section of a hydraulic coupling as set forth in claim 1 wherein said fastening loop defines a circular opening for reception of the socket section of the hydraulic coupling.

6. A resilient dust cover in combination with a socket section of a hydraulic coupling as set forth in claim 1 wherein said raised portion joining said strap with said disc portion defines a raised portion radially inward from the external periphery of said disc portion.

7. A resilient dust cover in combination with a socket section of a hydraulic coupling as set forth in claim 1 wherein said strap defines a length greater than the external diameter of said disc portion of said plug end.

8. A resilient dust cover in combination with a socket section of a hydraulic coupling as set forth in claim 1 wherein said strap defines a length greater than the external diameter of the fastening loop of said resilient dust cover.

9. A resilient dust cover in combination with a socket section of a hydraulic coupling as set forth in claim 1 wherein said disc portion defines a sealing axial surface and a sealing radial flange for sealing in the socket of said socket section.

* * * * *